(12) United States Patent
Angell et al.

(10) Patent No.: US 7,868,768 B2
(45) Date of Patent: Jan. 11, 2011

(54) TRACKING GENETICALLY MODIFIED ORGANISMS WITH RFIDS

(75) Inventors: Robert L. Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/043,253

(22) Filed: Mar. 6, 2008

(65) Prior Publication Data

US 2009/0224916 A1 Sep. 10, 2009

(51) Int. Cl.
*G08B 13/14* (2006.01)
(52) U.S. Cl. .............. 340/572.8; 340/572.1; 340/10.1; 340/10.5
(58) Field of Classification Search .............. 340/572, 340/10, 505
See application file for complete search history.

(56) References Cited

U.S. PATENT DOCUMENTS

| | | | | |
|---|---|---|---|---|
| 4,778,552 A * | 10/1988 | Benge et al. | ............. | 156/272.2 |
| 7,616,111 B2 * | 11/2009 | Covannon et al. | ...... | 340/539.12 |
| 2005/0212675 A1 * | 9/2005 | Green | ..................... | 340/572.8 |
| 2007/0008112 A1 * | 1/2007 | Covannon et al. | ...... | 340/539.12 |
| 2007/0008113 A1 * | 1/2007 | Spoonhower et al. | .. | 340/539.12 |
| 2009/0009332 A1 * | 1/2009 | Nunez et al. | ............. | 340/572.1 |
| 2009/0146810 A1 * | 6/2009 | Monk et al. | ............. | 340/572.1 |
| 2009/0153334 A1 * | 6/2009 | Burns et al. | ............. | 340/572.8 |
| 2009/0224916 A1 * | 9/2009 | Angell et al. | ............ | 340/572.1 |

* cited by examiner

*Primary Examiner*—Travis R Hunnings
(74) *Attorney, Agent, or Firm*—Dillon & Yudell LLP

(57) ABSTRACT

A Genetically Modified Organism (GMO) is tracked using Radio Frequency Identification (RFID) tags. A bulk load of GMOs, which is intended for consumption by livestock only, is laced with RFID tags at or near a time of harvest. If the RFID tags appear in a product that is intended for human consumption, then the product is pulled from distribution, since it contains GMOs that are potentially harmful to humans if eaten.

20 Claims, 6 Drawing Sheets

TRACKING GENETICALLY MODIFIED ORGANISMS WITH RFIDS

BACKGROUND OF THE INVENTION

1. Technical Field

The present disclosure relates to the field of agriculture, and specifically to Genetically Modified Organisms (GMOs). Still more particularly, the present disclosure relates to electronically tracking GMOs from or near a point of harvest.

2. Description of the Related Art

Genetically Modified Organisms (GMOs), also known as Genetically Engineered Organisms (GEOs), are organisms that have had their genetic material modified using genetic engineering technology, such as recombinant Deoxyribonucleic Acid (DNA) technology. By manipulating the DNA of an organism, a new organism is created.

While GMOs may be any type of living organism, including plants, animals, fungi, bacteria, etc., a prominent use of GMOs is in the field of agriculture, and particularly the growing of grains. Genetically modified agricultural products have been shown to be more resistant to drought, disease, insects, etc., thus increasing farming yield. However, a health concern has been raised as to whether GMOs are safe for human consumption. Therefore, there are regulations that permit GMOs to be used in livestock feed, but not in food that is to be directly consumed by humans.

SUMMARY OF THE INVENTION

A Genetically Modified Organism (GMO) is tracked using Radio Frequency Identification (RFID) tags. A bulk load of GMOs, which is intended for consumption by livestock only, is laced with RFID tags at or near a time of harvest. If the RFID tags appear in a product that is intended for human consumption, then the product is pulled from distribution, since it contains GMOs that are potentially harmful to humans if eaten.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
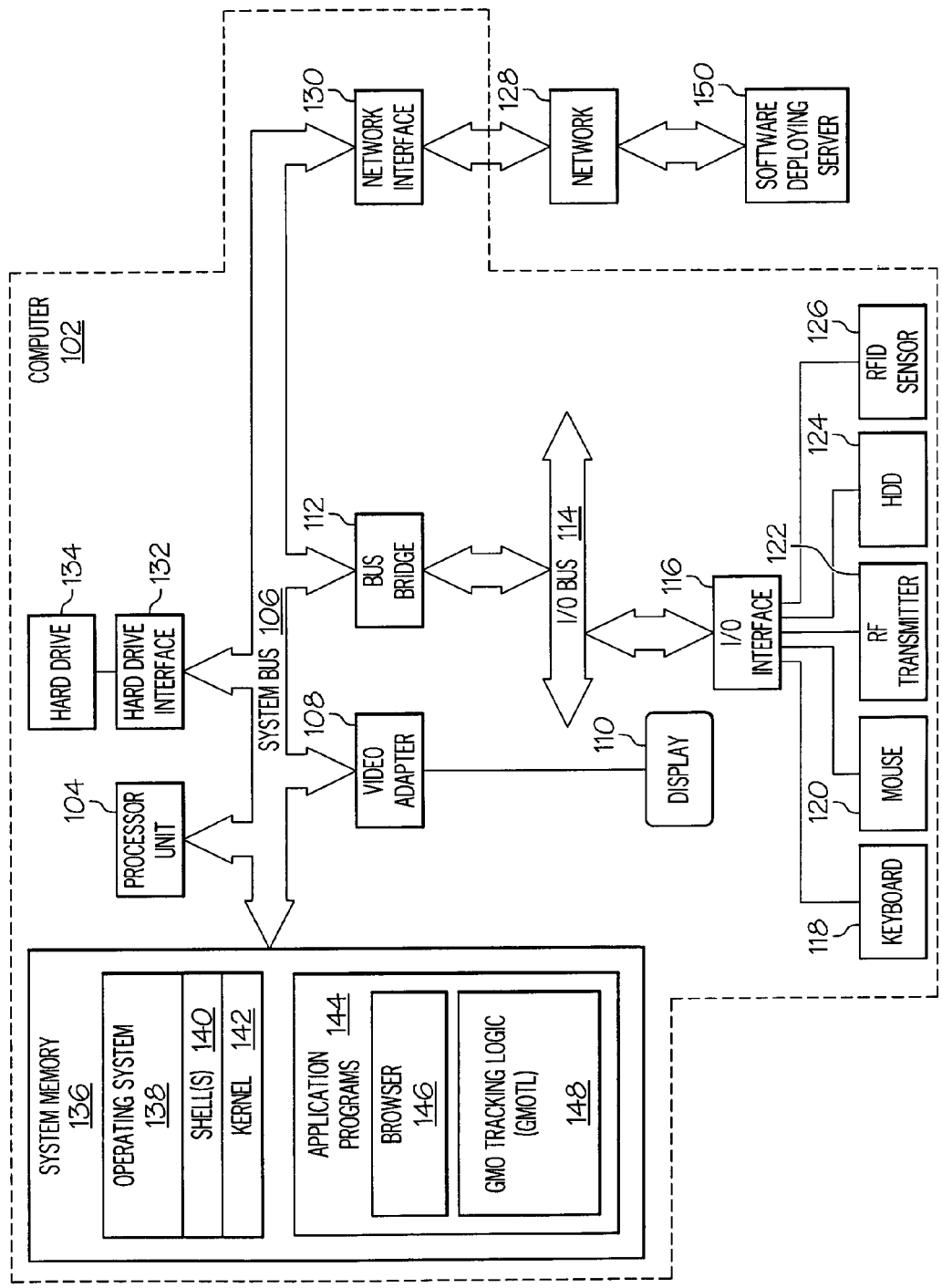
FIG. 1 depicts an exemplary computer which may be utilized by the present invention.

With reference now to the figures, and in particular to FIG. 1, there is depicted a block diagram of an exemplary computer 102, which the present invention may utilize. Note that some or all of the exemplary architecture shown for computer 102 may be utilized by software deploying server 150.

Computer 102 includes a processor unit 104, which may utilize one or more processors each having one or more processor cores, that is coupled to a system bus 106. A video adapter 108, which drives/supports a display 110, is also coupled to system bus An I/O interface 116 is coupled to I/O bus 114. I/O interface 116 affords communication with various I/O devices, including a keyboard 118, a mouse 120, a Radio Frequency (RF) transmitter 122, a Hard Disk Drive (HDD) 124, and a Radio Frequency Identification (RFID) sensor 126. It is recognized that RF transmitter 122 and RFID sensor 126 should be protected from one another, by distance or a shield (not shown), in order to enable proper functionality of the RFID sensor 126. The format of the ports connected to I/0 interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Genetically Modified Organism Tracking Logic (GMOTL) 148. GMOTL 148 includes code for implementing the processes described below, and particularly as described in FIGS. 7-9. In one embodiment, computer 102 is able to download GMOTL 148 from software deploying server 150, including in an on-demand basis. Note further that, in one embodiment of the present invention, software deploying server 150 performs all of the functions associated with the present invention (including execution of GMOTL 148), thus freeing computer 102 from having to use its own internal computing resources to execute GMOTL 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

In an exemplary embodiment, the present invention utilizes Radio Frequency Identification (RFID) tags to track Genetically Modified Organisms (GMOs) from or near their point of harvest. As known to those skilled in the art, an RFID tag may be active (i.e., battery powered), semi-passive (i.e., powered by a battery and a capacitor that is charged by an RF interrogation signal), or purely passive (i.e., either have a capacitor that is charged by an R-F interrogation signal or are geometrically shaped to reflect back specific portions of the RF interrogation signal). Passive RFID tags may contain an on-board Integrated Circuit (IC) chip, or they may be chipless.

Figure 2:
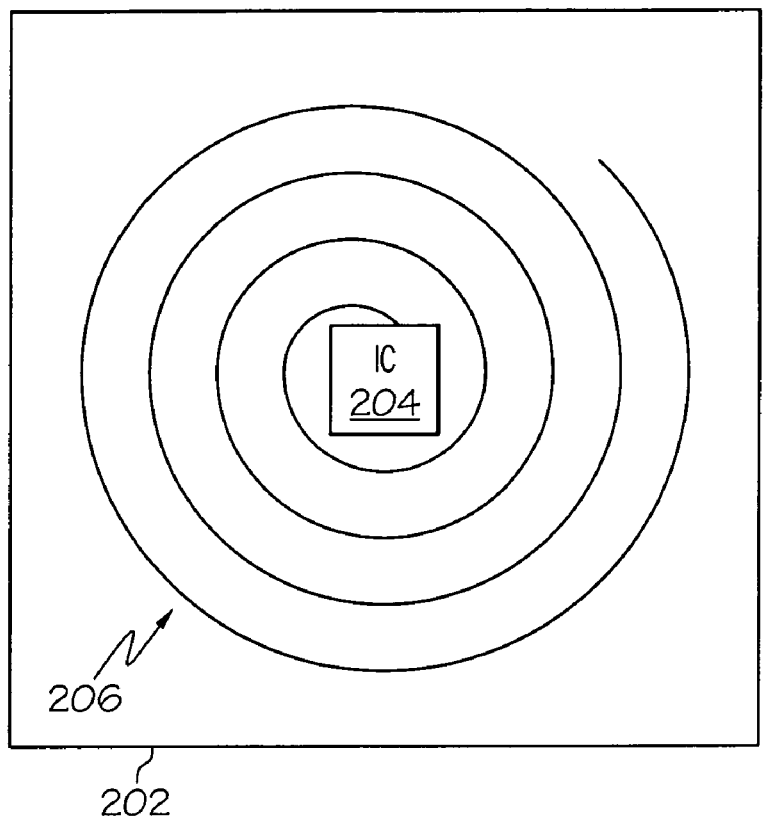
FIG. 2 illustrates an exemplary chip-enabled Radio Frequency Identification (RFID) tag, which may be utilized to identify Genetically Modified Organisms (GMOs)

Referring now to FIG. 2, an exemplary RFID tag 202 having an on-board IC chip is made up of two components: the IC chip 204 and a coupled antenna 206. The IC chip 204 stores and processes information, including Electronic Product Code (EPC) information that describes a GMO (e.g., gives the GMO's name, harvest location, harvest date, product description, etc.). The IC chip 204 may contain a low-power source (e.g., a capacitor, not shown, that is charged by an interrogation signal received by the coupled antenna). Upon the capacitor being charged, the IC chip 204 then generates a radio signal, which includes the EPC information, to be broadcast by the coupled antenna 206.

Figure 3:
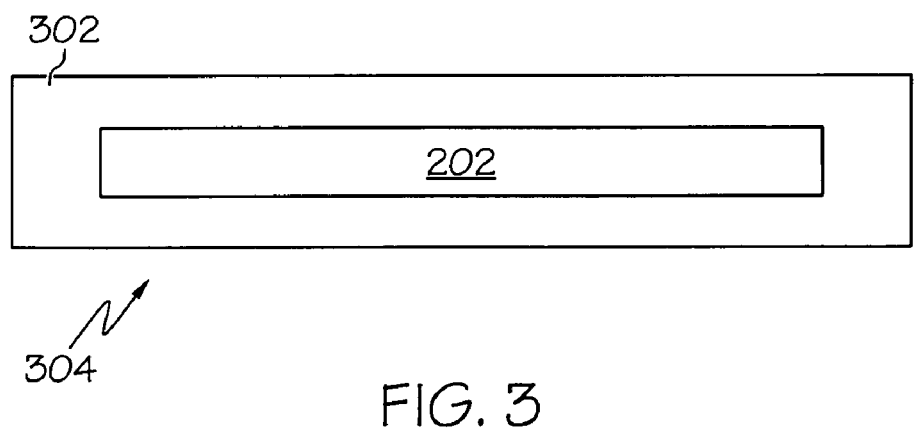
FIG. 3 depicts a cellulose coating for the chip-enabled RFID tag shown in FIG. 2.

Referring now to FIG. 3, the RFID tag 202 shown in FIG. 2 is shown with a cellulose coating 302 to form an RFID tag 304. Cellulose coating 302 serves at least two purposes. First, cellulose coating 302 provides heat protection for the RFID tag 202. IC 204 in RFID tag 202 may be sensitive to heat extremes, and in particular high heat. If the RFID tag 202 is being utilized to identify a GMO such as grain, this grain may be stored in a large silo or large transport vessel (e.g., in the hold of a ship). Compression causes high heat to be generated, particularly in the middle of a bulk load. The cellulose coating 302 provides a thermal barrier to such high heat.

Second, the cellulose coating 302 is used to confirm that a product, which is associated with the RFID tag 202, has been digested by a non-human animal, such as a cow. Note that a human's digestive tract is unable to digest cellulose. However, many types of livestock, including ruminants such as cattle, have enzymes and bacteria in their digestive tracts (e.g., the rumen) that break down and digest cellulose. Thus, if RFIDs 304 are detected in feces, it may be assumed that the GMOs labeled by the RFIDs 302 were not digested by cattle, and thus the GMOs may have been consumed by humans. This assumption is based on other assumptions, including that the RFID 202 will become disabled when exposed to the gastric juices of any animal, and that the cellulose coating 302 is impervious to gastric juices other than those associated with the digestion of cellulose.

Figure 4A:
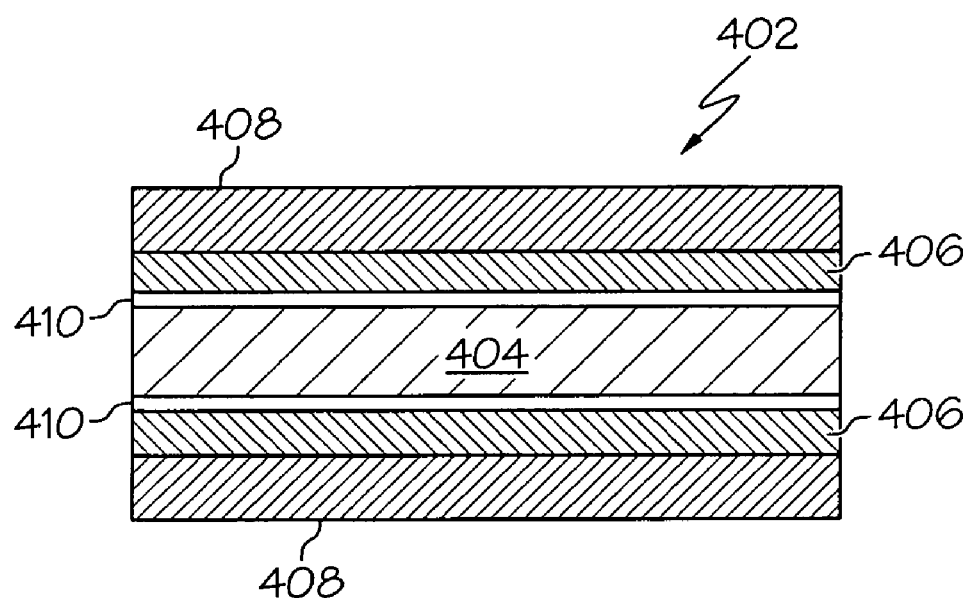
FIGS. 4a-b illustrate the cellulose-coated chip-enabled RFID tag, shown in FIG. 3, with an additional slough-able Faraday shield.
Figure 4B:
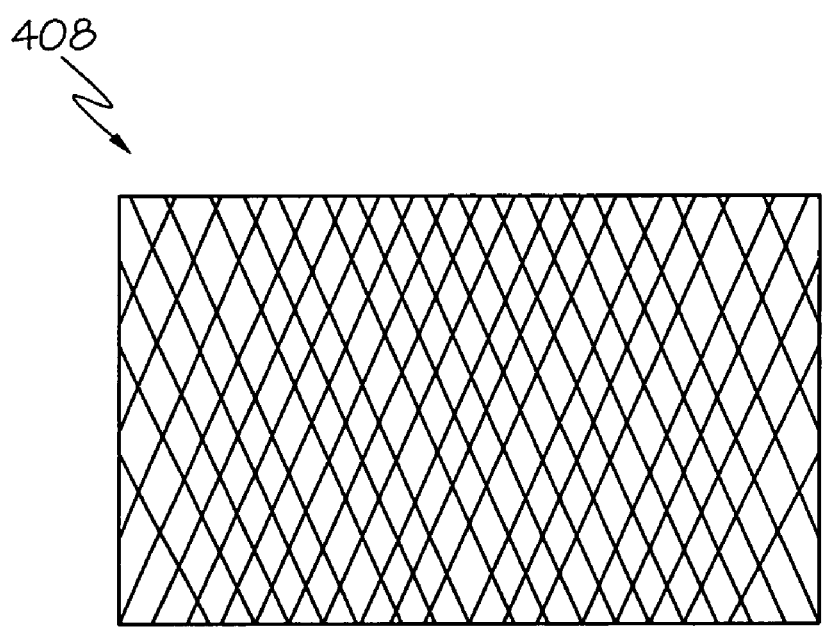

An RFID tag 402 depicted in FIGS. 4*a-b* illustrates a secondary RFID tag that may be used to confirm that the RFID tag 402 has been digested by herbivore livestock, such as cattle. As shown in the side cutaway view of FIG. 4*a*, RFID tag 402 has an inner RFID tag 404, which may have a construction similar to that depicted as RFID tag 202 shown in FIG. 2. Furthermore, RFID tag 404 has a cellulose coating (covering) 406, which is similar to the cellulose coating 302 shown in FIG. 3. However, RFID tag 402 also has a Faraday shield coating 408 and, optionally, a gastric-acid-resistant shield 410. When cellulose coating 406 is digested (and thus removed) by a non-human herbivore such as a cow, the Faraday shield 408 sloughs off, allowing RF signals to reach the inner RFID tag 404. Note that if the inner RFID tag 404 is susceptible to being disabled when exposed to gastric acid (found in any animal's digestive tract), the gastric-acid-resistant shield 410 keeps the inner RFID tag 404 from being damaged/disabled.

Thus, assume that a load of feces (e.g., fertilizer) arrives at a farm, but there is a question as to whether the feces contains only livestock manure (acceptable for use as a fertilizer on crops grown for human consumption), or if the fertilizer also contains human feces (and thus is unacceptable for use as a fertilizer on crops grown for human consumption). If interrogation of the fertilizers with an RF interrogation signal reveals no ID signals from RFID tag 404, then it can be assumed that the feces did NOT come from a ruminant (e.g., a cow), particularly if the RFID tag 402 has a protective shield 410 that prevents gastric juices, from any animal, from destroying (disabling) the RFID tag 404. That is, if a cow ate the RFID tag 402, then the Faraday shield coating 408 would have been removed, such that the RFID tag 404 (either unaffected by gastric juices or protected from gastric juices by protective shield 410) is still able to return a digital signature. However, if a human ate the RFID tag 402, then the Faraday shield coating 408 would still be intact, and no signature would be returned by the inner RFID tag 404.

In another embodiment, assume that there is no Faraday shield coating 408, but that 1) the RFID tag is disabled/damaged if exposed to the gastric juice of any animal and 2) the cellulose coating 406 is impervious to the gastric juice of any animal., yet is still digestable by a ruminant such as a cow. Thus, if the GMO (laced with secondary RFID tags 402) is eaten by a human, the human's digestive tract cannot digest the cellulose coating 406, and thus the RFID tag 404 is still functional (returns a digital signature signal). However, if the GMO (laced with the secondary RFID tags 402) are eaten by a cow, the cow's digestive tract will digest and remove the cellulose coating 406, thus exposing the RFID tag 404 to the gastric juices of the cow's system, and thus the RFID tag 404 is disabled. Therefore, in this alternate embodiment, the presence of an RFID signature signal suggests that the GMO was eaten by a human, while the absence of an RFID signature signal suggests that the GMO was eaten by a ruminant such as a cow.

Figure 5:
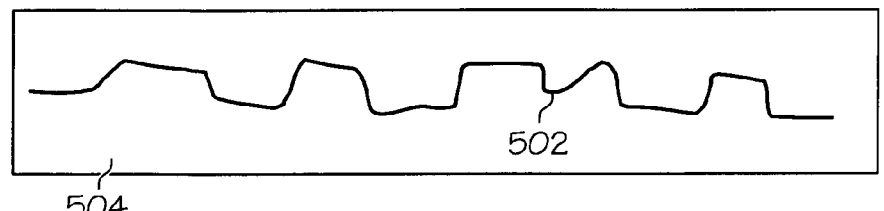
FIG. 5 depicts an exemplary chipless RFID with a protective coating.

As depicted in FIG. 5, the same principles described above for RFID tag 304 may also be applied to a chipless RFID tag 502. As the name implies, chipless RFID tag 502 does not have an IC chip, but is only an antenna that is shaped to reflect back a portion of an interrogation RF signal. That is, the chipless RFID tag 502 (also known as a Radio Frequency (RF) fiber) is physically shaped to reflect back select portions of a radio interrogation signal from an RF transmission source. Chipless RFID tag 502 typically has a much shorter range than an RFID chip that includes an on-board IC chip, such as RFID tag 202. Furthermore, the amount of information that chipless RFID tag 502 can store and return is much smaller than that of RFID tag 202 with its on-board IC chip.

Continuing to refer to FIG. 5, chipless RFID tag 502 can also be coated with a cellulose coat 504 that, when digested by a non-human, can corrode and thus disable the chipless RFID tag 502. Alternatively, chipless RFID tag 502 can have a metal-impregnated coating, such as coating 406 shown above in FIG. 4, to confirm that the chipless RFID tag 502 has passed through the digestive system of a cow.

Figure 6:
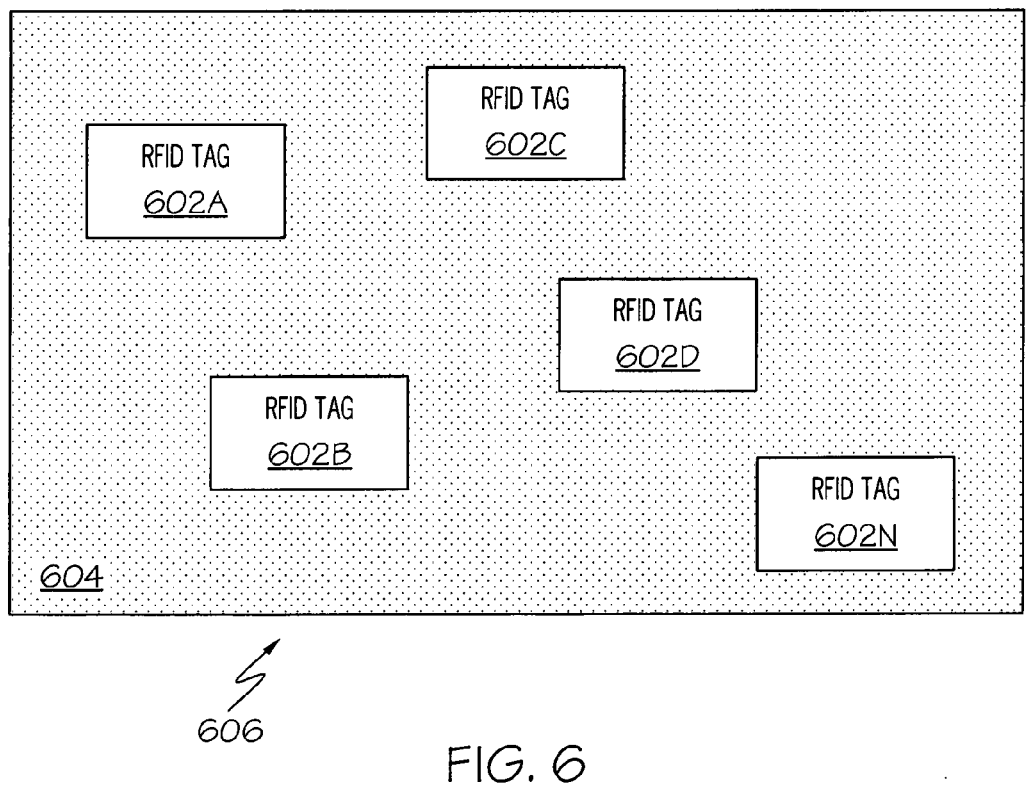
FIG. 6 illustrates a bulk load of material that is laced with multiple RFID tags in an unbound colloidal manner.

With reference now to FIG. 6, an exemplary use of RFID tags 602a-n, where "n" is an integer, to identify bulk material 604 in a pipeline or vessel 606 is depicted. RFID tags 602a-n may utilize any combination of RFID tags described above, including RFID tags 202, RFID tag 304, RFID tag 402 and chipless RFID tag 502. Note that the multiple RFID tags 606a-n are not adhered to the bulk material 604, but rather are suspended within the bulk material 604 in a colloidal state. Note also that the RFID tags 602a-n are not shown to scale. That is, the RFID tags 602a-n are preferably small (i.e., less than 0.5 mm×0.5 mm), in order to allow them to flow freely and without clogging piping. In one embodiment, the RFID tags 602a-n remain uniformly mixed throughout the bulk material 604. If the bulk material 604 is a dry particulate matter (e.g., GMOs such as grain), then the RFID tags 602a-n will naturally remain in a dispersed orientation. However, if the bulk material 604 is a liquid (e.g., an emulsion of GMO grain), then a buoyancy coating may need to be applied around the RFID tags 604a-n, in order to give them a same specific gravity as the bulk material 604.

Figure 7:
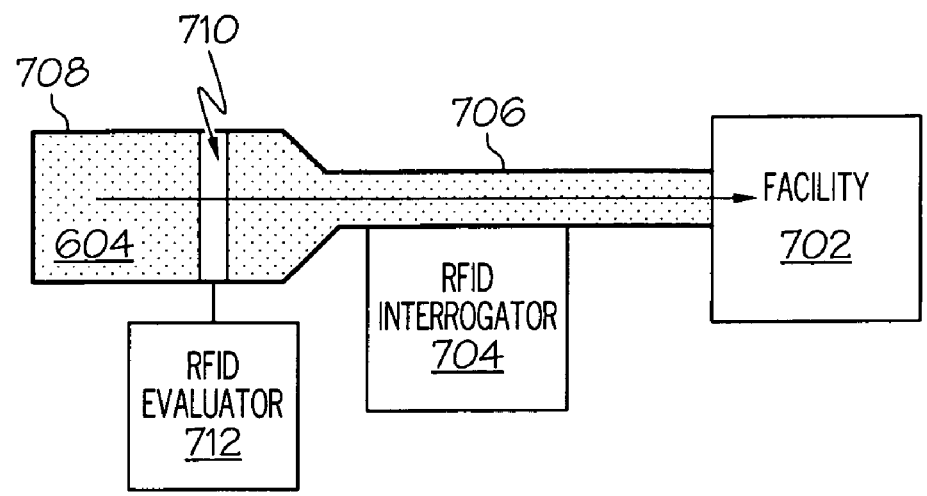
FIG. 7 depicts a tapered inlet line used to enable detection of RFID tags in a pipeline.
Figure 8:
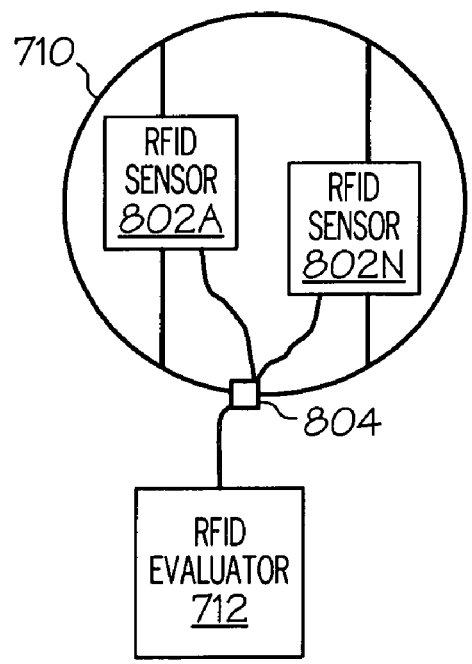
FIG. 8 illustrates additional detail of a RFID sensors supported by a grid that is internal to a pipeline.

Referring now to FIG. 7, as bulk material 604 (laced with the RFID tags 602a-n) enters a facility 702 (i.e., a bakery, a feedlot, a farm field, etc.), the RFID tags 602a-n are detected by an RFID interrogator 704. RFID interrogator 704 utilizes an architecture substantially described in FIG. 1 for computer 102. That is, RFID interrogator 704 includes an RF transmitter 122 and at least one RFID sensor 126, which interrogates the passing RFID tags 602a-n as they enter the facility 702. This interrogation is accomplished by transmitting an RF interrogation signal from an RF transmitter (e.g., RF transmitter 122 shown in FIG. 1) in the RFID interrogator 704 to the RFID tags 602a-n, which then respond (to RFID sensor 126 shown in FIG. 1) with ID data for the bulk material 604. Note that RFID interrogator 704 is positioned against piping 706, which has been narrowed (tapered, necked) down from piping 708. That is, piping 708 is so large in diameter that RFID tags 602a-n in the middle of the inlet piping 708 would be unable to be "heard" by the RFID interrogator 704 if RFID interrogator 704 were placed next to the larger diameter piping 708.

Another solution to detecting all RFID tags 602a-n is presented by grid 710 and RFID evaluator 712. Grid 710 is a (rigid, semi-rigid or flexible) grid that is mounted within piping 708 in a traverse manner (i.e., where the face of the grid 710 is perpendicular to the flow of the bulk material 604). The grid 710 is preferably made of material that is both impervious (non-reactive, non-corrosive, etc.) to the bulk material 604, and also poses no electrical interference (including RF shielding) to the RFID tags 602a-n. Mounted on the grid 710 are multiple RFID sensors 802a-n (shown in FIG. 8, where "n" is an integer), which are coupled via a sealed coupler 804 (that permits power and data communication to flow between the RFID sensors 802a-n and an RFID evaluator 712 without allowing the bulk material 604 to escape the piping 708) to RFID evaluator 712. The RFID evaluator 712 is substantially similar to the architecture shown in FIG. 1 for computer 102, except that the RFID sensors 802a-n (analogous to RFID sensor 126 shown in FIG. 1) are external to the computer 102.

Figure 9:
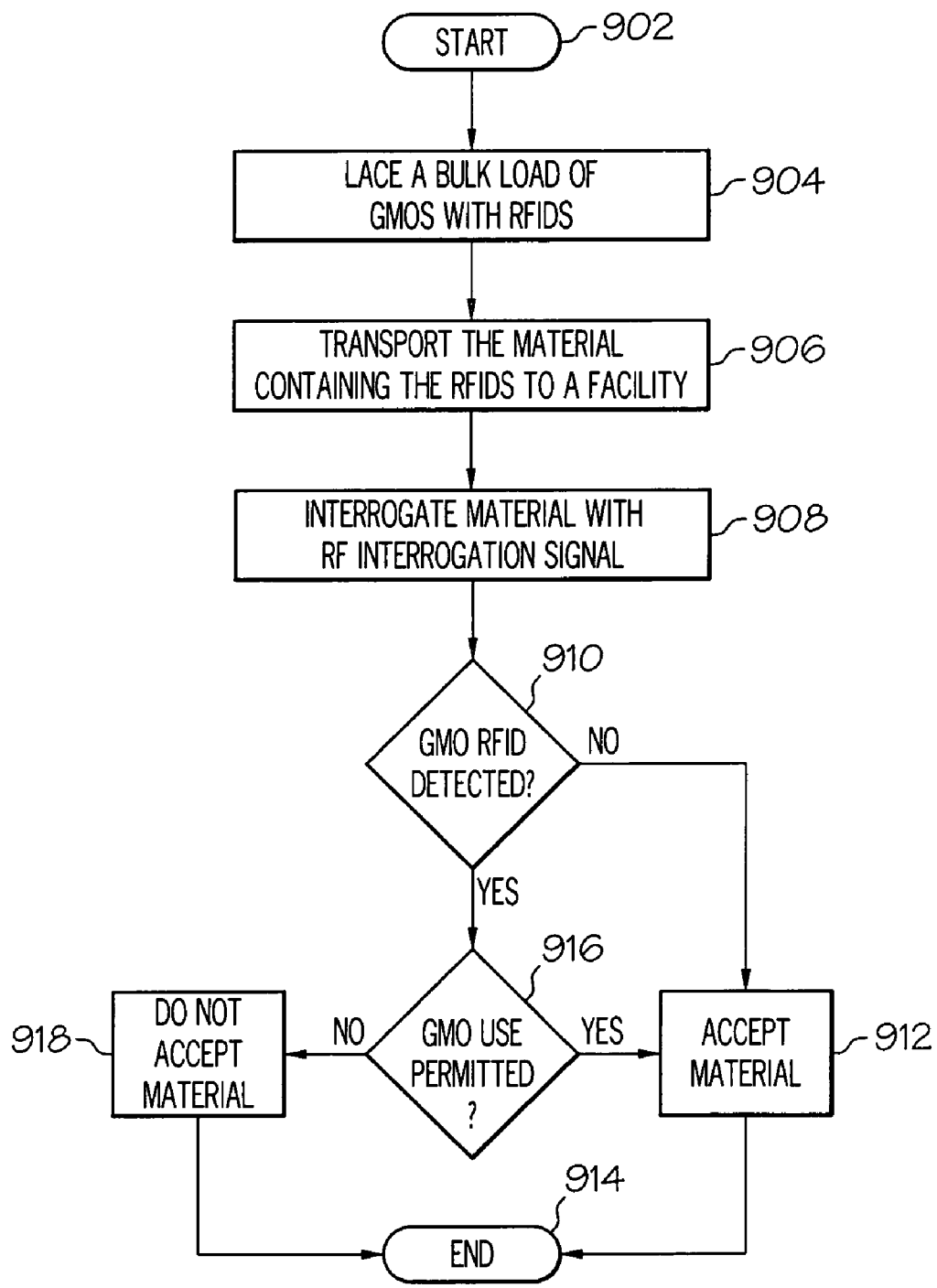
FIG. 9 is a high-level flow-chart of exemplary steps taken to determine whether a material contains GMOs.

With reference now to FIG. 9, a high-level flow-chart of exemplary steps taken to track GMOs (e.g., grain), which are intended for non-human consumption only, is presented. After initiator block 902, a bulk load of GMOs is laced with RFIDs (block 904). This lacing is performed at a time and place that is at, or near, the point of harvest. That is, the RFIDs may be mixed into the bulk load of GMOs in the field as grain is conveyed into a harvester, or may be mixed later (e.g., at a grain silo). Note that these RFIDs may be uncoated or coated RFIDs, including secondary RFIDs used to later confirm that feces is from a non-human, as described above. Note further that the RFIDs are suspended unattached to, and free-flowing with, the bulk load to form a colloidal state. As described in block 906, material (e.g., GMO grain, fertilizer, etc.) is transported to a facility. For example, if the material is a bulk load of raw GMOs such as grain, the facility may be a feed lot (in which GMO use is acceptable) or a bakery (in which GMO use is unacceptable). If the material is fertilizer, the facility may be a field of grain destined for livestock feed only (acceptable to use human waste), or a field of grain destined for human consumption (unacceptable to use human waste).

The incoming bulk material is interrogated with an RF interrogator (block 908). This interrogation requires that an RF sensor be physically close enough to the RFID tags, and thus may require spreading the incoming bulk material out on a screen, or tapered piping/grids (described in FIGS. 7-8). If a GMO-identifying RFID is not detected (query block 910), then is can be assumed that the bulk material is acceptable for any use (block 912), and the process ends (terminator block 914). However, if a GMO-identifying RFID is detected (query block 910), either in the raw GMO or in manure, then a query is made as to whether GMO products (e.g., grain) or by-products (e.g., manure) are permitted for use at the receiving facility (query block 916). Based on this decision, the material is either accepted (block 912) or rejected (block 918).

Note that while RFID tag 304 and RFID tag 402 are depicted as RFID tags, it is understood that the concept of coating an electronic device with a cellulose coating, in order to determine if that device has passed through an herbivore's digestive track, may be applied to any electronic device that is corrupted if exposed (with the cellulose coating digested away) to gastric juices within a digestive tract. That is, by coating any electronic device with a cellulose coating, the digestion away of that cellulose coating to expose the electronic device (and thus altering the functionality of that electronic device) can be used to indicate whether or not the electronic device passed through an herbivore that is capable of digesting cellulose. The presence of a functioning electronic device, with the cellulose coating intact, in feces suggests that the electronic device may have been eaten by a human.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of tracking Genetically Modified Organisms (GMOs), the method comprising:
   receiving a bulk load of GMOs that is laced with Radio Frequency Identification (RFID) tags, wherein the RFID tags are suspended unattached to the bulk load of GMOs to form a colloidal state, wherein the GMOs are intended for non-human consumption only;
   wherein said RFID tags are coated to provide a first functionality of said RFID tags following consumption of said RFID tags by a human;
   wherein said RFID tags are covered to provide a second, different functionality of said RFID tags following consumption of said RFID tags by a herbivore; and
   interrogating the RFID tags in the bulk load of GMOs with a Radio Frequency (RF) interrogation signal, wherein the RFID tags identify the bulk load of GMOs.

2. The method of claim 1, wherein the bulk load of GMOs is grain.

3. The method of claim 1, wherein each of the RFID tags is coated with a cellulose coating.

4. The method of claim 3, wherein the cellulose coating is engineered to provide heat protection to the RFID tags.

5. The method of claim 3, wherein the cellulose coating is digestible only by livestock, and wherein dissolving the cellulose coating exposes the RFID tags to digestive juices in the digestive tracks of the livestock, wherein said RFID tags contain circuitry that is substantially disabled based on exposure of said RFID tags to digestive juices.

6. The method of claim 3, wherein the cellulose coating acts as a Faraday shield against RF signals, wherein the RFID tags further comprise a protective layer that is resistant to digestive juices in digestive tracks of livestock, wherein the protective layer is beneath the cellulose coating, and wherein the RFID tags remain functional after passing through the digestive tracks of the livestock.

7. The method of claim 1, wherein the bulk load of GMOs is further laced with secondary RFID tags in a colloidal state, wherein each of the secondary RFID tags is covered by a cellulose coating that is digestible by herbivores, wherein the cellulose coating is indigestible by a human digestive track, wherein the cellulose coating is covered by a Faraday shield that blocks RF signals, and wherein digesting the cellulose coating causes the Faraday shield to fall away from each of the secondary RFID tags, the method further comprising:
   interrogating, with a secondary RF interrogation signal, a load of fertilizer that comprises feces, wherein receiving a responsive a secondary identification signal from the secondary RFID tags indicates that that GMOs were digested by non-herbivores.

8. The method of claim 7, wherein the non-herbivores are humans.

9. The method of claim 7, wherein the cellulose coating is engineered to provide heat protection to the secondary RFID tags.

10. A method of tagging Genetically Modified Organisms (GMOs), the method comprising:
    lacing a bulk load of GMOs with Radio Frequency Identification (RFID) tags, wherein the RFID tags are suspended unattached to the bulk load of GMOs to form a colloidal state, wherein the RFID tags identify the GMOs as being intended for non-human consumption only;
wherein said RFID tags are coated to provide a first functionality of said RFID tags following consumption of said RFID tags by a human; wherein said RFID tags are covered to provide a second, different functionality of said RFID tags following consumption of said RFID tags by a herbivore.

11. The method of claim 10, wherein the RFID tags are engineered to become disabled when digested by the livestock.

12. The method of claim 11, wherein the GMOs are grain.

13. The method of claim 10, wherein the livestock are herbivores, and wherein the RFID tags are coated with a cellulose coating that dissolves within digestive tracks of the livestock.

14. The method of claim 13, wherein the cellulose coating is engineered to provide heat protection to the RFID tags.

15. The method of claim 13, wherein dissolving the cellulose coating exposes the RFID tags to digestive juices in the digestive tracks of the livestock, wherein said RFID tags contain circuitry that is substantially disabled based on exposure of said RFID tags to digestive juices.

16. The method of claim 13, wherein the cellulose coating acts as a Faraday shield against RF signals, wherein the RFID tags further comprise a protective layer that is resistant to digestive juices in the digestive tracks of the livestock, wherein the protective layer is beneath the cellulose coating, and wherein the RFID tags remain functional after passing through the digestive tracks of the livestock.

17. The method of claim 10, wherein the bulk load of GMOs is further laced with secondary RFID tags in a colloidal state, wherein each of the secondary RFID tags is covered by a cellulose coating that is digestible by herbivores, wherein the cellulose coating is indigestible by a human digestive track, wherein the cellulose coating is covered by a Faraday shield that blocks RF signals, and wherein digesting the cellulose coating causes the Faraday shield to fall away from each of the secondary RFID tags, the method further comprising:

interrogating, with a secondary RF interrogation signal, a load of fertilizer that comprises feces, wherein receiving a responsive identification signal from the secondary RFID tags indicates that that GMOs were digested by non-herbivores.

18. The method of claim 17, wherein the non-herbivores are humans.

19. An electronic device comprising:

electronic hardware logic; and a cellulose coating around the electronic hardware logic, wherein the electronic hardware logic remains enabled unless the cellulose coating is removed by a digestive tract of a herbivore; and wherein the electronic hardware logic is disabled if exposed to digestive juices within an animal's digestive tract; and wherein said electronic hardware logic are tags that are consumable by a human, a herbivore, and other animals.

20. The electronic device of claim 19, wherein the electronic hardware logic is associated with a product, and wherein the electronic hardware logic generates a digital identification signal of the product.

* * * * *